United States Patent
Temel et al.

(10) Patent No.: US 12,071,137 B2
(45) Date of Patent: Aug. 27, 2024

(54) LANE BIASING TO INDICATE AN INTENDED MOVEMENT OF A VEHICLE

(71) Applicant: Robert Bosch GmbH, Stuttgart (DE)

(72) Inventors: Veli Kivanc Temel, Detroit, MI (US); Scott Fohey, Bloomfield Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 246 days.

(21) Appl. No.: 17/317,971

(22) Filed: May 12, 2021

(65) Prior Publication Data

US 2022/0363257 A1 Nov. 17, 2022

(51) Int. Cl.
| | |
|---|---|
| *B60W 10/18* | (2012.01) |
| *B60W 10/04* | (2006.01) |
| *B60W 10/10* | (2012.01) |
| *B60W 10/20* | (2006.01) |
| *B60W 30/18* | (2012.01) |
| *B60W 50/04* | (2006.01) |
| *B60W 50/14* | (2020.01) |

(52) U.S. Cl.
CPC ...... *B60W 30/18163* (2013.01); *B60W 10/04* (2013.01); *B60W 10/18* (2013.01); *B60W 10/20* (2013.01); *B60W 30/18159* (2020.02); *B60W 50/14* (2013.01); *B60W 2420/403* (2013.01); *B60W 2552/05* (2020.02); *B60W 2552/10* (2020.02); *B60W 2710/20* (2013.01); *B60W 2720/10* (2013.01); *B60W 2720/12* (2013.01)

(58) Field of Classification Search
CPC ..... H04L 9/321; H04L 9/0643; H04L 9/3236; H04L 9/3297; H04L 9/50; H04L 2209/56; H04L 9/0897; H04L 9/3239; H04L 9/3247; G06F 21/16; G06F 2221/0733; G06F 21/602; G06F 21/64; G06F 16/27; G06Q 10/10; G06Q 40/02; G06Q 50/182; G06Q 2220/10; G06Q 40/04
USPC .......................................................... 701/25
See application file for complete search history.

(56) References Cited

U.S. PATENT DOCUMENTS

| | | | |
|---|---|---|---|
| 9,340,207 B2 | 5/2016 | Nagasaka et al. | |
| 9,731,755 B1* | 8/2017 | Moshchuk | ............... B62D 6/04 |
| 10,843,690 B2 | 11/2020 | Shalev-Shwartz et al. | |
| 2010/0209881 A1* | 8/2010 | Lin | ....................... G09B 19/167 |
| | | | 434/66 |

(Continued)

FOREIGN PATENT DOCUMENTS

| | | | |
|---|---|---|---|
| KR | 20150107361 | * | 9/2015 |
| KR | 20150107361 A | * | 1/2024 |

*Primary Examiner* — Yonel Beaulieu
*Assistant Examiner* — Jean W Charleston
(74) *Attorney, Agent, or Firm* — Maginot, Moore & Beck LLP (57) ABSTRACT

A method for automated control of a vehicle includes automatically navigating a vehicle within a current lane of travel with a driving assistance system, and predetermining a steering maneuver during the automatic navigation with the driving assistance system. The method also includes, prior to performing the predetermined steering maneuver, biasing the vehicle within the current lane of travel with an offset from a center of the current lane of travel using the driving assistance system, the offset in a direction of the predetermined steering maneuver, and performing the predetermined steering maneuver with the driving assistance system.

20 Claims, 7 Drawing Sheets

(56) References Cited

U.S. PATENT DOCUMENTS

| | | | |
|---|---|---|---|
| 2012/0166032 A1* | 6/2012 | Lee | B60W 50/08 |
| | | | 701/23 |
| 2013/0253767 A1* | 9/2013 | Lee | B60W 50/04 |
| | | | 701/41 |
| 2014/0207325 A1* | 7/2014 | Mudalige | B62D 15/0255 |
| | | | 701/25 |
| 2017/0240171 A1* | 8/2017 | Chia | B60W 40/08 |
| 2019/0299984 A1* | 10/2019 | Shalev-Shwartz | |
| | | | B60W 60/0015 |
| 2020/0039523 A1* | 2/2020 | Ghasemalizadeh | B62D 15/025 |
| 2020/0331481 A1* | 10/2020 | Szczerba | B60R 1/27 |
| 2021/0061270 A1* | 3/2021 | Parks | B60W 10/18 |

* cited by examiner

LANE BIASING TO INDICATE AN INTENDED MOVEMENT OF A VEHICLE

FIELD

This disclosure relates to the field of automated and autonomous vehicles and, in particular, to systems and methods for exhibiting an intended movement of an automated or an autonomous vehicle.

BACKGROUND

Modern on-road vehicles typically include some level of driving automation. SAE International describes the levels of automation ranging from level 0 to level 5. These levels of automation are briefly described herein. A level 0 (SAE 0) vehicle includes no automation, and a level 5 (SAE 5) vehicle has full automation. In vehicles with SAE 0 through level 2 (SAE 2), a human driver monitors the driving environment. In vehicles with level 3 (SAE 3) through SAE 5, an automated driving system monitors the driving environment.

In an exemplary SAE 2 application, a partially automated vehicle includes adaptive cruise control and lane centering. In this application, the vehicle automatically maintains a predetermined speed and/or a predetermined distance from a leading vehicle. The vehicle is also equipped to stay centered in a lane by automatically controlling a steering angle of the vehicle. In an SAE 2 vehicle, the driver must be ready to intervene immediately any time that the automated system fails to respond properly. The driver "intervenes" by controlling the steering angle with the steering wheel and by controlling the speed of the vehicle with the brake pedal and/or the acceleration pedal.

Some SAE 2 applications require the driver to maintain contact with the steering wheel during the driving assistance, while other SAE 2 applications permit the driver to release the steering wheel during the driving assistance. When the driver has contact with the steering wheel, the driver acts as a corrective measure to ensure that the driving assistance system operates properly. Unpredicted behaviors of the driving assistance system can be tolerated and corrected, since the driver has the sense of control. When the hands of the driver are not in contact with the steering wheel, however, a significant portion of the driver's connection to the driving task is removed. When not contacting the steering wheel, the driver monitors the actions of the driving assistance system and pays attention to the road ahead for any hazard that may require the driver to intervene.

In known driving assistance systems, the driver of the vehicle is sometimes unable to determine sufficiently if the driving assistance system going to control the vehicle in a desired manner. That is, in viewing the human-machine interfaces ("HMI") of the vehicle, such as the instrument cluster, the driver is provided with insufficient information to determine if the vehicle is going to behave as desired. For example, when approaching an intersection in which the driver of the vehicle desires the vehicle to turn left, the driver cannot determine if the vehicle will perform the desired movement based on the provided information from the instrument cluster. In response to the lack of information, the driver typically takes control of the vehicle and manually performs the desired movement. In many instances, however, the driving assistance system would have performed the desired movement, without driver intervention.

Based on the above, it is desirable to convey even more clearly the intended movements and actions of the vehicle to the driver when the vehicle is under the control of the driving assistance system.

SUMMARY

According to an exemplary embodiment of the disclosure, a method for automated control of a vehicle includes automatically navigating a vehicle within a current lane of travel with a driving assistance system, and predetermining a steering maneuver during the automatic navigation with the driving assistance system. The method also includes prior to performing the predetermined steering maneuver, biasing the vehicle within the current lane of travel with an offset from a center of the current lane of travel using the driving assistance system, the offset in a direction of the predetermined steering maneuver, and performing the predetermined steering maneuver with the driving assistance system.

According to another exemplary embodiment of the disclosure, a driving assistance system for a vehicle includes a lane position sensor system and a controller. The lane position sensor system is configured to generate position data corresponding to a distance of a centerline of the vehicle from a center of a current lane of travel of the vehicle. The controller is operably connected to the lane position sensor system to receive the position data. The controller is configured to automatically navigate the vehicle within the current lane of travel, and to predetermine a steering maneuver during the automatic navigation. The controller is also configured, prior to performing the predetermined steering maneuver, to bias the vehicle within the current lane of travel with an offset from the center of the current lane of travel based on the position data, the offset in a direction of the predetermined steering maneuver, and to perform the predetermined steering maneuver.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the disclosure and their equivalents may be devised without parting from the spirit or scope of the disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

Figure 1:
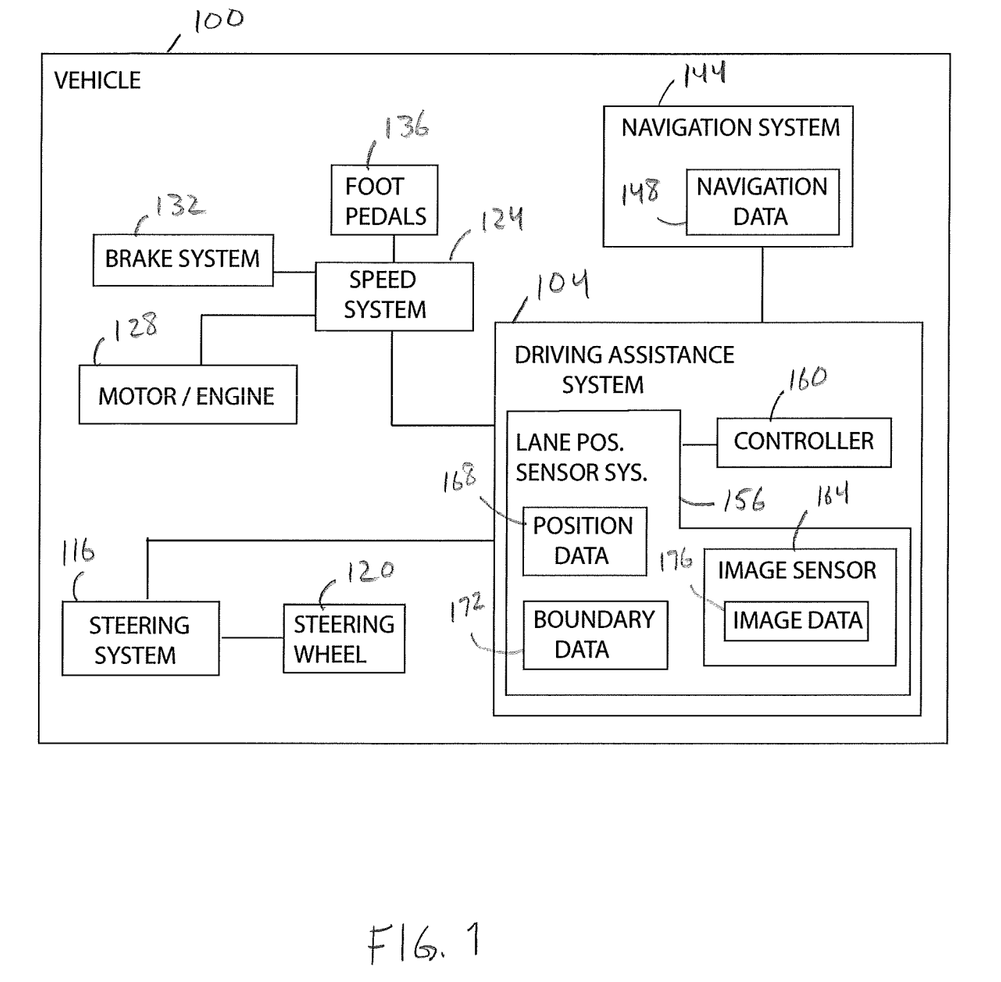
FIG. 1 is a block diagram of a vehicle including a driving assistance system configured to bias a position of the vehicle within a lane of travel relative to a center of the lane of travel.

As shown in FIG. 1, a vehicle 100 includes a driving assistance system 104 configured to navigate the vehicle 100. The vehicle 100 is a personal vehicle, a rental car, a shuttle, a limousine, a corporate vehicle, a livery vehicle, a taxi, or a semi-trailer truck. The vehicle 100 is any automotive machine suitable for travel on a roadway system, such as public and private roads, highways, and interstates. The vehicle 100 may have any level of automation from SAE 1 through SAE 5. In an exemplary embodiment, the vehicle 100 is an SAE 2 application having both speed and steering angle automatically controlled by the driving assistance system 104.

According to this disclosure, the driving assistance system 104 is configured to control a position of the vehicle 100 within a current lane 108 (FIG. 2) of travel so that the vehicle 100 is biased from a center 112 of the lane 108 in advance of a steering maneuver. An occupant of the vehicle 100 senses and/or observes the biased position of the vehicle 100 and is informed of the intended path of the vehicle 100. Accordingly, the occupant is less likely to take over control of the vehicle 100 and is more likely to continue allowing the driving assistance system 104 to navigate the vehicle 100 automatically. Each element of the vehicle 100 and a method 300 (FIG. 3) for controlling the vehicle 100 with driving assistance system 104 are disclosed herein.

The exemplary vehicle 100 of FIG. 1 further includes a steering system 116 and a steering wheel 120, a speed system 124 operably connected to a motor 128, a brake system 132, and foot pedals 136. The steering system 116 is configured to control a steering angle of the vehicle 100 so that the vehicle 100 can be automatically and/or manually maneuvered around corners and along roads. The steering system 116 moves, pivots, and/or rotates wheels of the vehicle 100 relative to a chassis of the vehicle 100 to steer the vehicle 100. The steering system 116 may be controlled by the driving assistance system 104 so that the steering angle of the vehicle 100 is automatically electronically controlled. The steering system 116 may also be manually controlled by an operator of the vehicle 100 using the steering wheel 120, which is operably connected to the steering system 116. The operator of the vehicle 100 is also referred to as a driver. As used herein, the steering angle of the vehicle 100 is an angle of the wheels of the vehicle relative to a centerline 140 (FIG. 2) of the vehicle 100. In an exemplary embodiment, a positive steering angle causes the vehicle 100 to turn or track left, a zero magnitude steering angle causes the vehicle 100 to track straight, and a negative steering angle causes the vehicle 100 to turn or track right.

The motor 128 is configured to generate a drive torque for moving the vehicle 100. In one embodiment, the drive torque is transmitted to the wheels of the vehicle 100 through a transmission. Alternatively, the drive torque is directly transmitted to the wheels, and the vehicle 100 does not include a transmission. In a specific embodiment, the motor 128 is an electric motor supplied with electrical energy from a battery of the vehicle 100. In another embodiment, the motor 128 is an internal combustion engine that burns a fuel for generating the drive torque. In a further embodiment, the motor 128 is a hybrid combination including an electric motor and an internal combustion engine, as is known in the art. The motor 128 and/or the motor 128 and transmission combination are also be referred to herein a powertrain and/or a drivetrain of the vehicle 100.

The brake system 132 is configured to generate a braking force for slowing the vehicle 100 and for maintaining the vehicle 100 in a stopped position. The brake system 132, in one embodiment, is a hydraulic brake system including disc brakes.

With reference to FIG. 1, the speed system 124 is configured to automatically control a speed of the vehicle 100. For example, the speed system 124 controls the motor 128 to generate a desired magnitude of the drive torque for moving the vehicle 100 at a desired speed. The speed system 124 may also control the brake system 132 for automatically slowing the vehicle and for automatically bringing the vehicle 100 to a controlled and comfortable stop.

The foot pedals 136 are operably connected to the speed system 136 and are configured to enable an operator of the vehicle 100 to manually control the speed system 124 and to manually control the speed of the vehicle 100. The foot pedals 136 include at least an acceleration pedal for controlling the magnitude of the drive torque of the motor 128, and a brake pedal for selectively activating the brake system 132 for slowing or stopping the vehicle 100.

As shown in FIG. 1, the vehicle 100 also includes a navigation system 144 configured to generate navigation data 148. The navigation system 144 is operably connected to the driving assistance system 104 and is configured to provide the navigation data 148 to the driving assistance system 104. In one embodiment, the navigation system 144 is a satellite navigation system that uses the global positioning system (GPS), the global navigation satellite system (GNSS), and/or any other satellite-based navigation system.

The navigation data 148, in one embodiment, includes map data corresponding to a map of roadways available to the vehicle 100, route data corresponding to a route from a starting point to a destination using the available roadways, and location data corresponding to a current location of the vehicle 100 on the Earth and relative to the available roadways. In one embodiment, the operator of the vehicle 100 configures the navigation system 144 with a desired destination, and the navigation system 144 automatically generates the route date for navigating the vehicle 100 to the destination. As described herein, the driving assistance system 104 typically automatically controls the speed and/or the steering angle of the vehicle 100 to navigate the vehicle 100 to the destination based on the route data.

With continued reference to FIG. 1, the driving assistance system 104 includes a lane position sensor system 156 operably connected to a controller 160. The lane position sensor system 156 includes an image sensor 164 and is configured to generate position data 168 and boundary data 172 based on electronic image data 176 from the image sensor 164.

Figure 2:
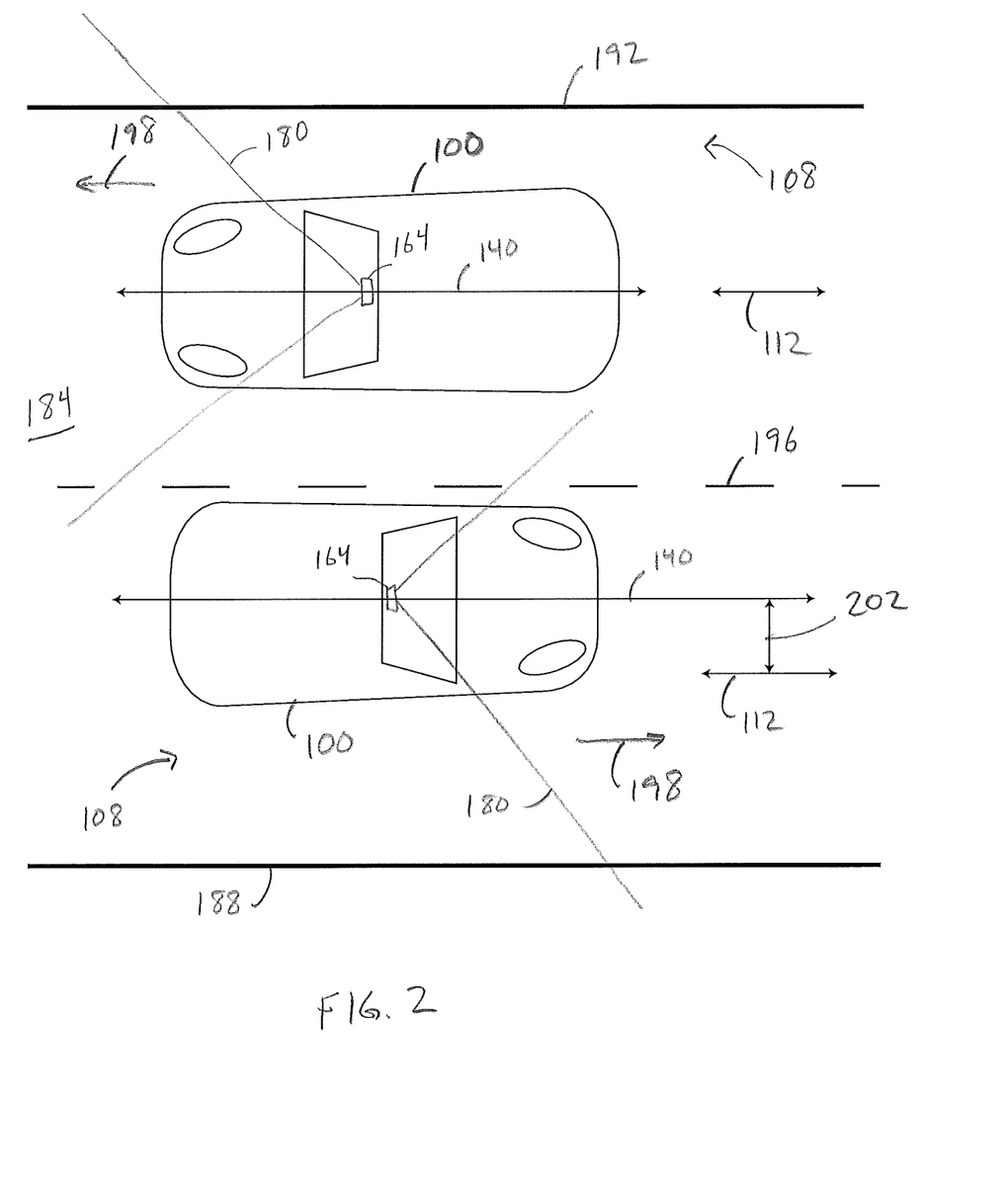
FIG. 2 is a diagram showing a top view of two vehicles on a road, the upper vehicle is not biased within its lane of travel, and the lower vehicle is biased within its lane of travel.

As shown in FIG. 2, in an exemplary embodiment, the image sensor 164 is a visible light imaging device mounted on or in the vehicle 100, such that a field of view 180 of the image sensor 164 extends from the front of the vehicle 100. The image sensor 164 is configured to generate the image data 176 corresponding to images of the road 184 ahead of the current position of the vehicle 100 and includes data corresponding to a road edge 188, an opposite road edge 192, and road surface markings that identify lanes of travel, such as the striped line 196. The field of view 180 extends to both road edges 188, 192. Exemplary road surface markings include painted markings dividing and/or identifying lanes of travel. In another embodiment, the image sensor 164 is configured as a thermal imaging device configured to generate the image data 176 based on thermal radiation and/or an infrared radiation.

In one embodiment, in addition to generating the position data 168 and the boundary data 172 based on the image data 176 from the image sensor 164, the driving assistance system 104 is also configured to generate the position data 168 and the boundary data 172 based on data from other additional other sensors and systems, including but not limited to, a LIDAR (light detection and ranging) system configured to generate LIDAR data, and a radar system that is configured to generate radar data. The controller 160 uses the LIDAR data, the radar data, and/or the navigation data 148 to better interpret the image data 176 and to generate even more accurate position data 168 and boundary data 172.

The boundary data 172 generated by the lane position sensor system 156 identifies at least the boundaries of the current lane of travel 108 of the vehicle 100. For example, in FIG. 2, the boundary data 172 of the upper vehicle 100 identifies the striped line 196 (a left boundary) and the road edge 192 (a right boundary) as the boundary data 172. The boundary data 172 of the lower vehicle 100 in FIG. 2 is identified as the striped line 196 (a left boundary) and the road edge 188 (a right boundary).

Figure 4:
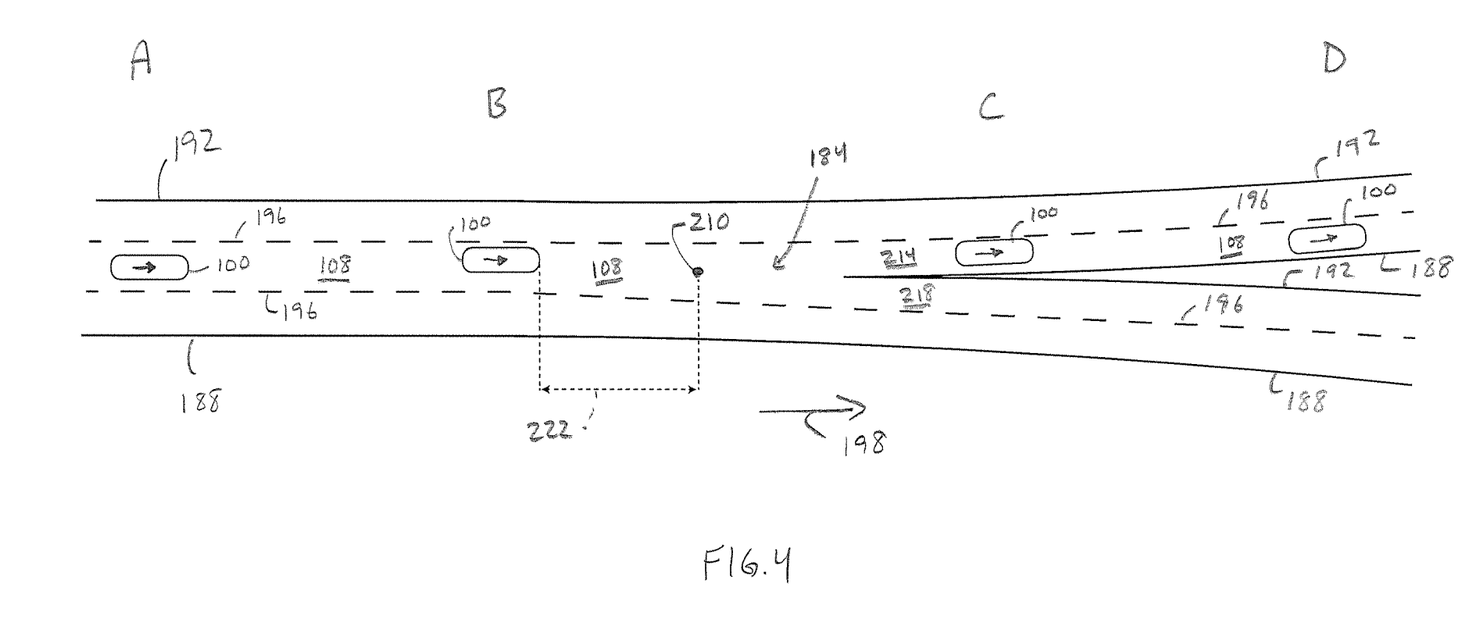
FIG. 4 is a diagram showing a top view of the vehicle of FIG. 1 at four different positions, the vehicle is exhibiting lane biasing and is executing a predetermined steering maneuver.

The lane position sensor system 156 is configured to determine the center 112 of the current lane of travel 108 by processing the boundary data 172. For example, in FIG. 2, for the lower vehicle 100, the center 112 of the current lane of travel 108 is determined as a midpoint between the stripped line 196 and the road edge 188. In other embodiments, the road 184 does not include road surface markings, such as on typical two-way residential streets. In such an embodiment, the center of the current lane of travel 108 is determined by first identifying a road midpoint between the detected road edges 188, 192. Then, using the road midpoint and the nearest road edge 188, 192, the lane position sensor system 156 identifies the center 112 of the lane 108 as halfway between the road midpoint and the nearest road edge 188, 192. In yet another embodiment (as shown in FIG. 4), on a multilane road having multiple sets of the striped lines 196, the lane of travel 108 is defined on both sides by the striped line 196 and the center 112 is halfway between the striped lines 196 defining the lane 108. The lane position sensor system 156 may use any other process to identify the center 112 of the current lane of travel 108.

The position data 168 generated by the lane position sensor system 156 correspond to a distance of the centerline 140 of the vehicle 100 from the center 112 of the lane 108. The centerline 140 is in a direction of travel 198 of the vehicle 100. The position data 168 are a measure of an offset 202 (FIG. 2) of the vehicle 100 and/or an offset distance of the vehicle 100. As used herein, the vehicle 100 is biased away from the center 112 of the lane 108 when the offset 202 is non-zero. As shown in FIG. 2, the upper vehicle 100 is navigating the lane 108 with the centerline 140 aligned with the center 112 of the lane 108, such that there is no offset 202 or zero offset 202. Accordingly, the position data 168 for the upper vehicle 100 are zero and/or correspond to zero distance between the centerline 140 and the center 112 of the lane 108. The upper vehicle 100 is not biased from the center 112 of the lane 108. Whereas, the lower vehicle 100 of FIG. 2 is biased towards the stripped line 196 (the left boundary) with a non-zero offset 202. For example, in FIG. 2, the lower vehicle 100 has position data 168 corresponding to an offset 202 of from thirty centimeters (30 cm) to one meter (1 m) away from the center 112 of the lane 108. The offset 202 may be on either side of the center 112 of the lane 108. When the vehicle 100 is biased with the offset 202, the centerline 140 of the vehicle 100 is spaced apart from the center 112 of the current lane of travel 108.

The optimal magnitude of the offset 202 is based on at least a total width of the lane 108 and a width of the vehicle 100 measured perpendicular to the direction of travel 198. The lane position sensor system 156 is configured to limit the offset 202, such that no portion of the vehicle 100 is located outside of boundaries of the lane 108, as determined by the boundary data 172. That is, when the vehicle 100 is biased with the offset 202, no portion of the vehicle 100 is located outside of the left boundary and the right boundary.

The controller 160 of the driving assistance system 104 is configured to control the steering angle and the speed of the vehicle 100 based on at least the navigation data 148, the position data 168, and the boundary data 172. The controller 160 is provided as at least one microcontroller and/or microprocessor. For example, the controller 160 is configured to control the steering system 116 to automatically bias the vehicle 100 away from the center 112 of the lane 108 by the offset 202. The controller 160 is also configured to control the speed of the vehicle 100 by controlling the drive torque of the motor 128 and by controlling the brake system 132. In certain SAE levels, such as SAE 3 through SAE 5, the driving assistance system 104 navigates the vehicle 100 based on data from other sensors and systems, such as obstacle data, traffic data, and pedestrian data.

Figure 3:
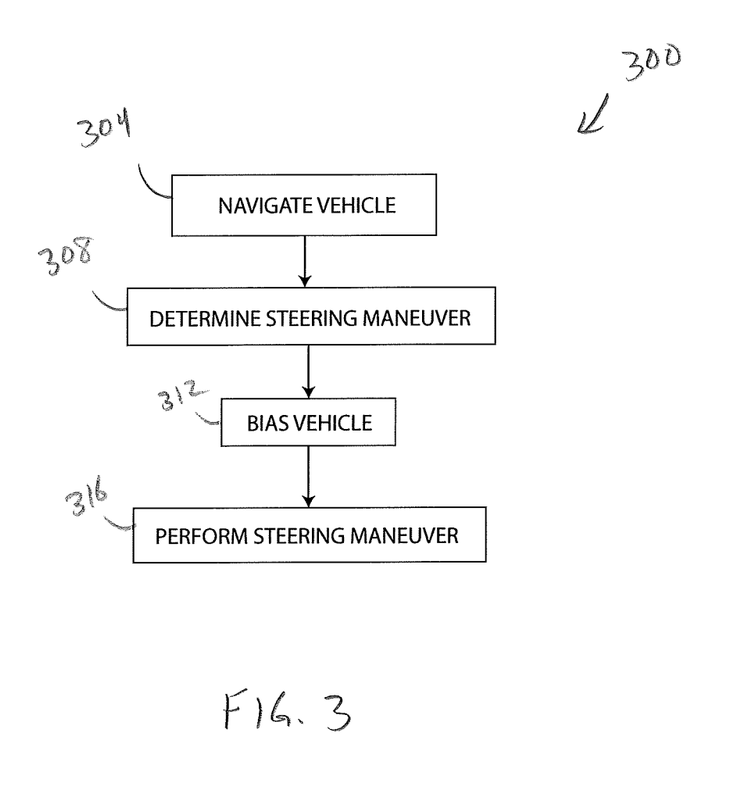
FIG. 3 is a flowchart illustrating an exemplary method of operating the vehicle and the driving assistance system of FIG. 1.

An exemplary method 300 of operating the vehicle 100 is shown in FIG. 3. At block 304 of the method 300, the driving assistance system 104 is configured to automatically navigate the vehicle 100 within the current lane of travel 108 of the road 184. As shown in FIG. 4, at position A, the driving assistance system 104 automatically navigates the vehicle 100 by automatically controlling the speed and the steering angle of the vehicle 100 using the speed system 124 and the steering system 116. The lane position sensor system 156 guides the vehicle 100 with the centerline 140 aligned with the center 112 of the lane 108. The lane 108 is defined on each side by the striped lines 196. The lane 108 at part A is generally straight; however, the driving assistance system 104 is configured to automatically maintain the centered position of the vehicle 100 through curves in the road 184 and/or the lane 108. Typically, at part A the operator of the vehicle 100 is not touching the steering wheel 120 and is not applying pressure to the foot pedals 136. That is, at part A the operator is not engaged in a takeover of the driving assistance system 104.

As used herein, a takeover occurs when the operator of the vehicle 100 intervenes with the automatic navigation provided by the driving assistance system 104 and manually navigates the vehicle 100 with the steering wheel 120 and the foot pedals 136. That is, when the takeover occurs, the operator becomes a "driver" and manually controls the steering angle and the speed of the vehicle 100. The operator has, therefore, taken over control of the vehicle 100 and the driving assistance system 104 no longer controls the speed and the steering angle of the vehicle 100. A necessary takeover occurs when the operator has decided that the driving assistance system 104 is not performing as intended and the operator desires to depart from the automatic navigation provided by the driving assistance system 104. An unnecessary takeover occurs when the operator mistakenly believes that the driving assistance system 104 is not performing as intended or will not perform as intended. For example, an unnecessary takeover occurs when the vehicle 100 is planning to automatically perform a steering maneuver, and the operator takes over the steering control to perform the same steering maneuver. As described herein, the method 300 prevents unnecessary takeovers by providing notice to the occupant of the predetermined steering maneuver.

Next, at block 308 of FIG. 3, the driving assistance system 104 predetermines a steering maneuver for the vehicle 100 during the automatic navigation. With reference again to FIG. 4, at a maneuver point 210, the vehicle 100 faces a lane split scenario at which the current lane of travel 108 splits into two separate lanes 214, 218 and the vehicle 100 must select one of the two separate lanes 214, 218 by steering into a selected lane 214. The driving assistance system 104 predetermines the steering maneuver by processing the route data and the map data of the navigation data 148 for the maneuver point 210 before the vehicle 100 reaches the maneuver point 210. The maneuver point 210 is also referred to herein as a decision point. The maneuver point 210 is the point or region at which the vehicle 100 is to perform the predetermined steering maneuver based on the navigation data 148. In the example of FIG. 4, the predetermined steering maneuver requires the vehicle 100 to adjust the steering angle to cause the vehicle 100 to track to the left and to select the left lane 214 of the two split lanes 214, 218. Other exemplary predetermined steering maneuvers are described herein with reference to FIGS. 6-8. Accordingly, the selected lane 214 is known prior to the vehicle 100 reaching position B of FIG. 4, such that the driving assistance system 104 can predetermine a corresponding steering maneuver.

As used herein, the steering maneuver corresponds to a movement of the vehicle 100 in a desired direction as controlled by the steering system 116. A steering maneuver that causes the vehicle 100 to turn to the left or to track to the left is in the left direction. A steering maneuver that causes the vehicle 100 to turn to the right or to track to the right is in the right direction.

At block 312 of FIG. 3, the driving assistance system 104 biases the vehicle 100 within the current lane of travel 108 with the offset 202 from the center 112 prior to performing the predetermined steering maneuver. The offset 202 is in a direction of the predetermined steering maneuver. With reference again to FIG. 4, the bias occurs at position B, which is a predetermined distance 222 from the maneuver point 210. The offset 202 is in the same direction that the vehicle 100 will track at the maneuver point 210. The magnitude of the offset 202 is determined based on at least the position data 168 generated by the lane position sensor system 156. The offset 202 continues through the maneuver point 210. There is no offset 202 at position D. The offset 202 is a pre-adjustment of the position of the vehicle 100 that occurs before the vehicle 100 reaches the decision point.

The offset 202 at position B, prior to the predetermined steering maneuver, provides an occupant of the vehicle 100 with notice of the direction of the predetermined steering maneuver and prevents the occupant from performing an unnecessary takeover of the driving assistance system 104. The occupant at position B senses that the vehicle 100 has been biased to the left side of the lane 108 and is no longer tracking along the center 112 of the lane 108. The occupant can feel the vehicle 100 track to the left and can also see that the vehicle 100 is closer to the left striped line 196 (the left boundary) than to the right striped line 196 (the right boundary). The occupant understands that when the vehicle 100 is biased to the left that the vehicle 100 will soon make a steering maneuver in the same direction. Thus, for example, when the occupant sees a road sign or a corresponding HMI display (i.e. an instrument cluster display) indicating that the desired route requires taking the left split lane 214, the occupant knows that the vehicle 100 will navigate to the left split lane 214 because the vehicle 100 is biased or offset to the left within the current lane of travel 108 at position B. In this way, the method 300 and the driving assistance system 104 are a technical improvement, because the occupant is provided with the information needed to prevent an unnecessary takeover and to continue to allow the driving assistance system 104 to navigate the vehicle 100.

The biasing provided at block 312 of the method 300 also provides other vehicles, occupants, and motorists notice of the intended path of the vehicle 100. For example, when other motorists observe the vehicle 100 at position B having the offset 202, the other motorists are provided with information that the vehicle 100 will soon perform a steering maneuver in the direction of the offset 202. It has been found that other motorists intuitively understand the pre-positioning of the vehicle 100 with the offset 202 as indicting a soon to occur steering maneuver. The other motorists can, therefore, drive even more safely knowing the intended path of the vehicle 100, as another technical improvement provided by the vehicle 100 and the driving assistance system 104.

The biasing provided at block 312 of the method 300 provides unexpected benefits to the operation of the vehicle 100 and also to the operation of other vehicles on the road. It was previously thought that an optimal approach for lane guiding the vehicle 100 is to maintain the vehicle 100 at the center 112 of the lane 108 at all times. This approach, however, misses an opportunity to provide helpful navigation information to the occupants of the vehicle 100 and also to other motorists. The descriptions of FIGS. 5 and 6 discuss further this concept.

Figure 5:
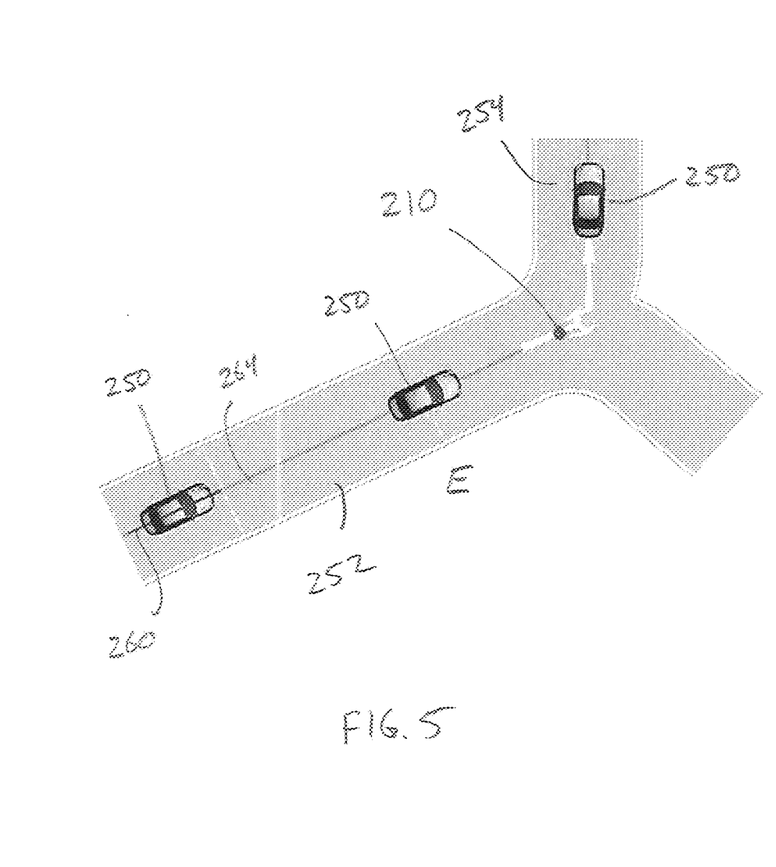
FIG. 5 is a diagram showing a top view of a vehicle at three different positions, the vehicle is not biased within its lane of travel.

For example, in FIG. 5, a vehicle 250 is guided through a lane split scenario without biasing or the offset 202. The vehicle 250 has at least a steering system that automatically controls a steering angle of the vehicle 250, such that the vehicle 250 is automatically navigated from the lane 252 to the lane 254. The vehicle 250 is maintained with the centerline 260 of the vehicle 250 aligned with a center 264 of the lanes 252, 254 through the maneuver point 210 without any offset 202. At position E, the vehicle 250 may cause an indicator on HMI to illuminate. That is, the vehicle 250 may cause the left turn signal to illuminate at position E, but the vehicle 250 maintains a centered position within the lane 252. It has been found that even with the illuminated turn signal or other HMI indicator, a typical occupant of the vehicle 250 is unsure if the vehicle 250 will actually navigate as indicated and the occupant lacks confidence in the guidance system. Some occupants feel that when the vehicle 250 is centered in the lane 252 through the maneuver point 210 that the driving style of the vehicle 250 is too "robotic" and feels unnatural. The information from the HMI is, therefore, many times insufficient to communicate the intended path of the vehicle 250 to the occupant. As a result, the occupant of the vehicle 250 is uncomfortable and performs an unnecessary takeover from the automatic steering system.

Figure 6:
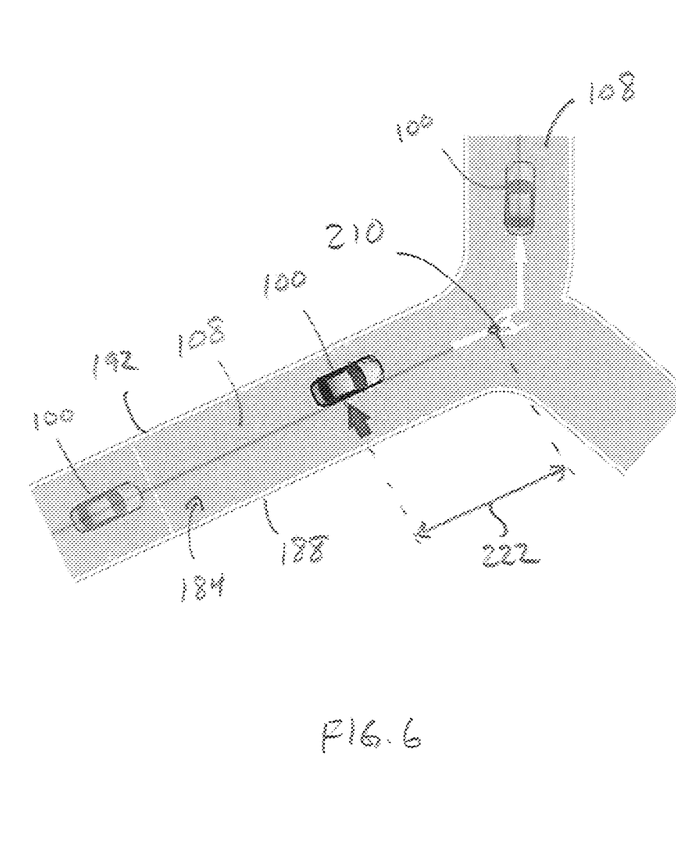
FIG. 6 is a diagram showing a top view of a vehicle at three different positions, the vehicle is biased within its lane of travel.

As shown in FIG. 6, the vehicle 100 performs the method 300 and is biased in the direction of the predetermined steering maneuver. The biasing and/or offset 202 of the vehicle 100 is a trajectory adaptation to the vehicle path that is configured to enhance the creature comfort of the navigation provided by the driving assistance system 104. Thus, the occupant is provided with the physical change in position of the vehicle 100 (i.e. the offset 202), which provides advance notice to the occupant that the vehicle 100 will perform the desired steering maneuver at the maneuver point 210. When combined with indicators of the HMI, the occupant is provided with even more information, thereby increasing the confidence of the occupant that the vehicle 100 will perform the predetermined steering maneuver at the maneuver point 210. The method 300 and the driving assistance system 104 increase the transparency of the intentions of the vehicle 100. The method 300 and the driving assistance system 104 also reduces the number of unnecessary occupant takeovers and increases the time that occupants can have hands off the steering wheel 120 and feet off the foot pedals 136.

At block 312 of the method 300 and with reference to FIGS. 4 and 6, the predetermined distance 222 is determined based on at least a speed of the vehicle 100. In one embodiment, the predetermined distance 222 is selected to provide the occupant with approximately ten to fifteen seconds advance notice of the predetermined steering maneuver. Accordingly, in an example, when the vehicle 100 is traveling at 100 km/hr, the predetermined distance is from about 280 m (about ten seconds notice) to about 420 m (about fifteen seconds notice). In other embodiments, any predetermined distance 222 that provides the occupant with sufficient notice to prevent an unnecessary takeover is used. Moreover, the occupant may select a desired predetermined distance 222 and/or a desired notice time period.

Next, at block 316 and with reference to position C of FIG. 4, the vehicle 100 performs the predetermined steering maneuver. In the example of FIG. 4, the vehicle 100 navigates through the maneuver point 210 and the driving assistance system 104 controls the steering system 116 to track the vehicle 100 to the selected lane 214. The vehicle 100 navigates through the maneuver point 210 with the offset 202 and then aligns the centerline 140 with the center 112 of the lane 108 at position D, so long as the vehicle 100 is not within the predetermined distance 222 of another predetermined steering maneuver.

Figure 7:
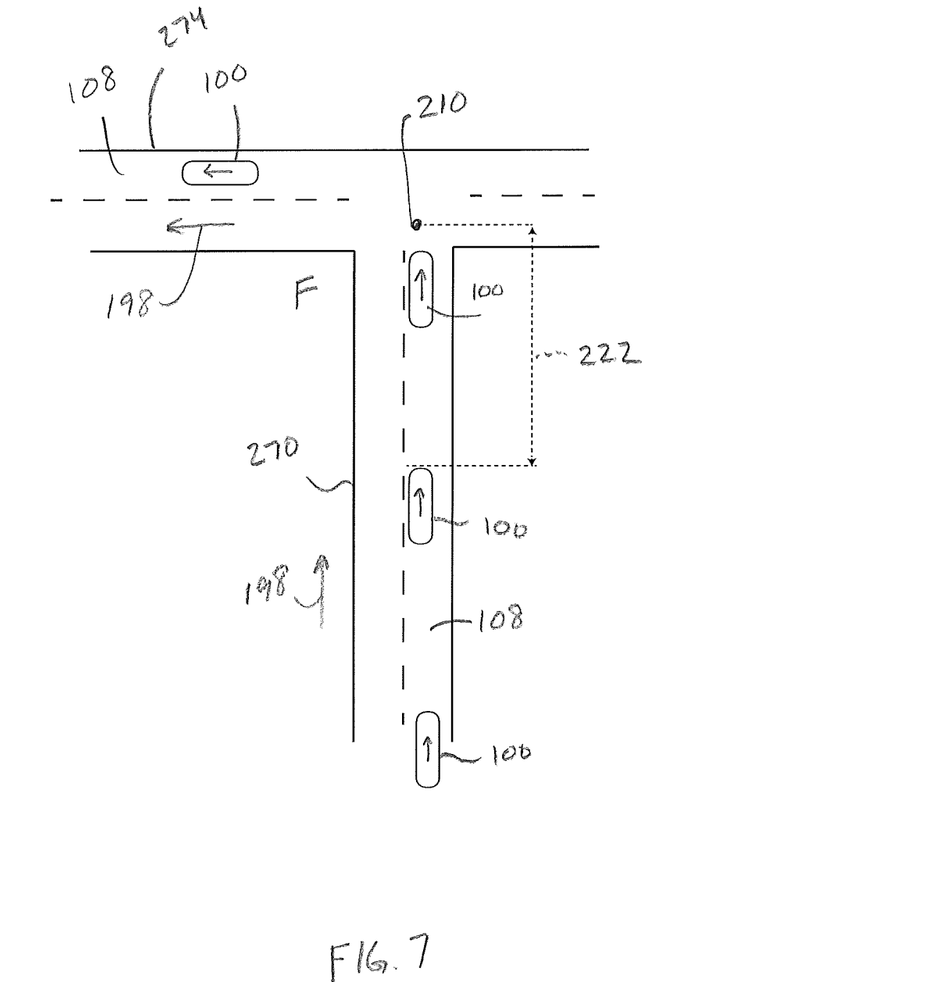
FIG. 7 is a diagram showing a top view of the vehicle of FIG. 1 at four different positions, the vehicle is exhibiting lane biasing and is executing a predetermined steering maneuver from a current roadway to a different roadway.

As shown in FIG. 7, the vehicle 100 is automatically navigated through a different type of predetermined steering maneuver with a corresponding offset 202 to convey the intended movement of the vehicle 100 to the occupant. The steering maneuver of FIG. 7 includes making a left turn at a controlled intersection from a current roadway 270 to a different roadway 274. The intersection is controlled with a stop sign, a traffic signal, and/or the like. Accordingly, the steering maneuver includes stopping at a stop sign or a red traffic signal automatically using the driving assistance system 104 and the speed system 124. At position F the vehicle 100 is stopped and is biased to the left side of the lane 108 with the offset 202. The current lane of travel 108 is part of the current roadway 270. The biasing informs the occupant of the intention of the vehicle 100 to turn left at an appropriate time onto the different roadway 274. After completing the turn, the driving assistance system 104 removes the offset 202 and guides the vehicle 100 down the center of the lane 108 of the different roadway 274 until the vehicle 100 is the predetermined distance 222 from the next predetermined steering maneuver.

Figure 8:
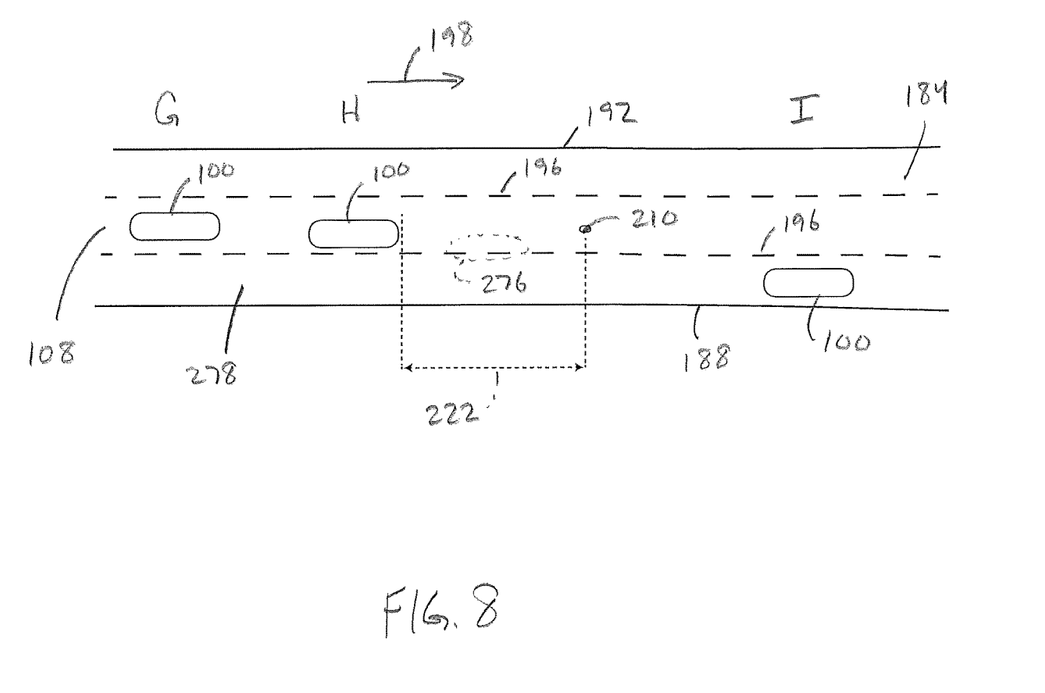
FIG. 8 is a diagram showing a top view of the vehicle of FIG. 1 at three different positions, the vehicle is exhibiting lane biasing and is executing a predetermined steering maneuver to an adjacent lane.

As shown in FIG. 8, the vehicle 100 is automatically navigated through yet another predetermined steering maneuver with a corresponding offset 202 to convey the intended movement of the vehicle 100 to the occupant. The steering maneuver of FIG. 8 includes navigating the vehicle 100 from the current lane of travel 108 to an adjacent lane 278 that is adjacent to the current lane of travel 108. At position G, the vehicle 100 is centered in the lane 108. At position H, the vehicle 100 is biased or offset towards the right boundary (striped line 196), and the occupant is made aware that the predetermined steering maneuver includes tracking the vehicle 100 to the right. The vehicle 100 is automatically guided to the adjacent lane 278 at the maneuver point 210. The vehicle 100 is guided down the center of the adjacent lane 278 at position I.

The vehicle 100 may include additional sensors and systems that are configured to detect roadway hazards, obstacles, obstructions, traffic, other vehicles, pedestrians, and the like, as part of an advanced driver-assistance system (ADAS). In one embodiment, the driving assistance system 104 is configured to operate in conjunction with the ADAS to prevent the vehicle 100 from being biased or offset when an obstruction or hazard is near the vehicle 100. For example, if the ADAS detects that another vehicle or obstacle is located in an area 276 (FIG. 8), then the driving assistance system 104 prevents the vehicle 100 from being offset and automatically moves the vehicle 100 to a suitable portion of the lane 108 and/or road 184. That is, in one embodiment, the driving assistance system 104 and the ADAS prioritize navigating the vehicle 100 properly around detected hazards and obstacles over lane biasing with the offset 202.

The biasing and offset performed by the driving assistance system 104 and the lane position sensor system 156 reduces the number of incorrect decisions made by the driving assistance system 104. For example, with reference again to FIG. 4, when the operator senses the offset 202 at position B, if the operator determines that the vehicle 100 should be navigated to the right lane 218, the operator is provided with sufficient notice to correct the vehicle path by performing a takeover. Specifically, the operator may grasp the steering wheel 120 and navigate the vehicle 100 to the lane 218. In this way, the offset provided by the driving assistant system 104 reduces the number of incorrect decisions of the system 104 by providing the operator with advance notice of the predetermined steering maneuver in sufficient time for the operator to select and/or perform a different steering maneuver.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for automated control of a vehicle comprising:
    automatically navigating a vehicle within a current lane of travel with a driving assistance system;
    predetermining a steering maneuver during the automatic navigation with the driving assistance system;
    prior to performing the predetermined steering maneuver, biasing the vehicle within the current lane of travel with an offset from a center of the current lane of travel using the driving assistance system, the offset in a direction of the predetermined steering maneuver;
    performing the predetermined steering maneuver with the driving assistance system; and
    stopping the vehicle within the current lane of travel with the offset prior to performing the predetermined steering maneuver with the driving assistance system,
    wherein the vehicle defines a centerline in a direction of travel,
    wherein the current lane of travel includes a left boundary and a right boundary, and
    wherein when the vehicle is biased with the offset (i) the centerline of the vehicle is spaced apart from the center of the current lane of travel, and (ii) no portion of the vehicle is located outside of the left boundary and the right boundary.

2. The method of claim 1, wherein:
    the current lane of travel splits into two separate lanes of travel, and
    the predetermined steering maneuver includes navigating the vehicle to a selected lane of the two separate lanes of travel.

3. The method of claim 1, wherein:
    an adjacent lane is adjacent to the current lane of travel, and
    the predetermined steering maneuver includes navigating the vehicle from the current lane of travel to the adjacent lane.

4. The method of claim 1, wherein:
    the current lane of travel is part of a current roadway, and
    the predetermined steering maneuver includes navigating the vehicle from the current roadway to a different roadway at an intersection of the current roadway and the different roadway.

5. The method of claim 4, wherein the stopping occurs at the intersection.

6. The method of claim 1, further comprising:
    determining a maneuver point at which the vehicle is to perform the predetermined steering maneuver with the driving assistance system; and
    biasing the vehicle a predetermined distance from the maneuver point with the driving assistance system, such that the offset provides an occupant of the vehicle with notice of the direction of the predetermined steering maneuver.

7. The method of claim 6, wherein the notice prevents an unnecessary takeover by an operator of the vehicle.

8. The method of claim 1, wherein the automatically navigating the vehicle comprises:
    automatically controlling a speed of the vehicle with the driving assistance system; and
    automatically controlling a steering angle of the vehicle with the driving assistance system.

9. The method of claim 1, wherein the predetermined steering maneuver includes navigating the vehicle from the current lane of travel to a selected lane of travel, the method further comprising:
    automatically navigating the vehicle within the selected lane of travel without biasing the vehicle with the offset with the driving assistance system.

10. The method of claim 1, wherein the biasing the vehicle occurs a predetermined distance from a maneuver point at which the predetermined steering maneuver is to be performed.

11. The method of claim 1, wherein a magnitude of the offset is based on a total width of the current lane of travel and a width of the vehicle.

12. A driving assistance system for a vehicle comprising:
    a lane position sensor system configured to generate position data corresponding to a distance of a centerline of the vehicle from a center of a current lane of travel of the vehicle; and
    a controller operably connected to the lane position sensor system to receive the position data, the controller configured to:
        automatically navigate the vehicle within the current lane of travel;
        predetermine a steering maneuver during the automatic navigation;
        prior to performing the predetermined steering maneuver, bias the vehicle within the current lane of travel with an offset from the center of the current lane of travel based on the position data, the offset in a direction of the predetermined steering maneuver;
        perform the predetermined steering maneuver;
        receive navigation data from a navigation system of the vehicle;
        determine a maneuver point at which the vehicle is to perform the predetermined steering maneuver based on the navigation data; and
        bias the vehicle a predetermined distance from the maneuver point.

13. The driving assistance system of claim 12, wherein:
    the lane position sensor system is further configured to detect a left boundary and a right boundary of the current lane of travel as boundary data, and
    the controller is further configured to bias the vehicle based on the boundary data, such that no portion of the vehicle is located outside of the left boundary and the right boundary.

14. The driving assistance system of claim 12, wherein:
    the lane position sensor system includes an image sensor configured to generate electronic image data, and
    the lane position sensor system generates the position data and the boundary data from the image data.

15. The driving assistance system of claim 12, wherein:
the vehicle further includes a speed system, a steering system, and a navigation system configured to generate navigation data; and
the controller is further configured to automatically navigate the vehicle by (i) controlling a steering angle of the vehicle based on the navigation data using the steering system, and (ii) controlling a speed of the vehicle based on the navigation data using the speed system.

16. The driving assistance system of claim 12, wherein the offset is configured to provide an occupant of the vehicle with notice of the direction of the predetermined steering maneuver.

17. The driving assistance system of claim 12, wherein:
the current lane of travel splits into two separate lanes of travel, and
the predetermined steering maneuver includes navigating the vehicle to a selected lane of the two separate lanes of travel.

18. The driving assistance system of claim 17, wherein:
the offset provides an occupant of the vehicle with notice of the selected lane, and
the notice prevents an unnecessary takeover by the occupant.

19. A method for automated control of a vehicle comprising:
automatically navigating a vehicle within a current lane of travel with a driving assistance system;
predetermining a steering maneuver during the automatic navigation with the driving assistance system, the steering maneuver having a direction;
prior to performing the predetermined steering maneuver, biasing the vehicle within the current lane of travel with an offset from a center of the current lane of travel using the driving assistance system, the offset resulting in moving the vehicle within the current lane of travel in the direction of the predetermined steering maneuver;
stopping the vehicle within the current lane of travel at a controlled intersection with the offset in the direction of the predetermined steering maneuver prior to performing the predetermined steering maneuver; and
performing the predetermined steering maneuver with the driving assistance system.

20. The method as claimed in claim 19, wherein the controlled intersection is controlled with a stop sign or a traffic signal.

* * * * *